(12) United States Patent
Kozhikkottu et al.

(10) Patent No.: US 10,936,507 B2
(45) Date of Patent: Mar. 2, 2021

(54) SYSTEM, APPARATUS AND METHOD FOR APPLICATION SPECIFIC ADDRESS MAPPING

(71) Applicant: Intel Corporation, Santa Clara, CA (US)

(72) Inventors: Vivek Kozhikkottu, Hillsboro, OR (US); Esha Choukse, Austin, TX (US); Shankar Ganesh Ramasubramanian, Hillsboro, OR (US); Melin Dadual, Beaverton, OR (US); Suresh Chittor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 16/367,592

(22) Filed: Mar. 28, 2019

(65) Prior Publication Data
US 2020/0310979 A1    Oct. 1, 2020

(51) Int. Cl.
| | | |
|---|---|---|
| *G06F 12/10* | (2016.01) | |
| *G06F 12/1009* | (2016.01) | |
| *G06F 16/907* | (2019.01) | |
| *G06F 9/54* | (2006.01) | |
| *G06F 12/0873* | (2016.01) | |
| *G06F 9/4401* | (2018.01) | |

(52) U.S. Cl.
CPC ......... *G06F 12/1009* (2013.01); *G06F 9/545* (2013.01); *G06F 12/0873* (2013.01); *G06F 16/907* (2019.01); *G06F 9/4401* (2013.01)

(58) Field of Classification Search
CPC ................ G06F 12/1009; G06F 12/0873
See application file for complete search history.

(56) References Cited

U.S. PATENT DOCUMENTS

| | | | |
|---|---|---|---|
| 2007/0124302 A1* | 5/2007 | Korn ............. | G06F 16/258 |
| 2007/0283123 A1 | 12/2007 | Vick et al. | |
| 2007/0283125 A1* | 12/2007 | Manczak ........ | G06F 11/3466 |
| | | | 711/207 |
| 2011/0161597 A1* | 6/2011 | Tremaine ........ | G06F 12/0895 |
| | | | 711/133 |
| 2011/0252180 A1* | 10/2011 | Hendry .......... | G06F 3/0604 |
| | | | 711/3 |
| 2013/0132704 A1* | 5/2013 | Ware ............. | G06F 12/04 |
| | | | 711/206 |
| 2013/0282972 A1* | 10/2013 | Nazm Bojnordi .. | G06F 13/1668 |
| | | | 711/105 |
| 2014/0101361 A1 | 4/2014 | Gschwind | |

(Continued)

OTHER PUBLICATIONS

Matthias Jung, ConGen: An Application Specific DRAM Memory Controller Generator, MEMSYS 2016 (Year: 2016).*

(Continued)

*Primary Examiner* — Ryan Bertram
(74) *Attorney, Agent, or Firm* — Trop, Pruner & Hu, P.C.

(57) ABSTRACT

In one embodiment, an apparatus includes: a page table circuit to receive a virtual address and to generate at least a portion of a physical address therefrom; and a mapping rule table coupled to the page table circuit, the mapping rule table to receive mapping metadata of a page of a system memory and, based on the mapping metadata, output a mapping rule for the page. Other embodiments are described and claimed.

20 Claims, 12 Drawing Sheets

(56) References Cited

U.S. PATENT DOCUMENTS

| | | | |
|---|---|---|---|
| 2014/0108773 A1* | 4/2014 | Jagatheesan | G06F 12/0653 |
| | | | 713/1 |
| 2016/0253123 A1* | 9/2016 | Jacob | G06F 12/0806 |
| | | | 711/103 |
| 2017/0060788 A1* | 3/2017 | Chang | G06F 13/1668 |
| 2017/0116132 A1* | 4/2017 | Mealey | G06F 13/1663 |
| 2017/0123779 A1* | 5/2017 | Albot | G06F 13/24 |
| 2017/0220485 A1 | 8/2017 | Kegel et al. | |
| 2017/0286216 A1 | 10/2017 | Kozhikkottu et al. | |
| 2017/0344489 A1* | 11/2017 | Kapoor | G06F 12/1009 |
| 2017/0371791 A1 | 12/2017 | Ranjan et al. | |
| 2018/0004597 A1 | 1/2018 | Kwon et al. | |
| 2018/0032721 A1* | 2/2018 | De | G06F 21/563 |

OTHER PUBLICATIONS

Mohsen Ghasempour, DReAM: Dynamic Rearrangement of Address Mapping to Improve the Performance of DRAMs, ARXIV, 2015 (Year: 2015).*

Linux, https://linux.die.net/man/2/madvise, "madvise(2)—Linus man page," accessed Mar. 27, 2019, 5 pages.

U.S. Appl. No. 16/236,151, filed Dec. 28, 2018, entitled "Minimal Aliasing Bit-Error Correction Code," by Dinesh Somasekhar.

European Patent Office, European Search Report dated Aug. 3, 2020 in European patent application No. 20154783.3, 6 pages.

\* cited by examiner

SYSTEM, APPARATUS AND METHOD FOR APPLICATION SPECIFIC ADDRESS MAPPING

TECHNICAL FIELD

Embodiments relate to performing address mapping in a processor.

BACKGROUND

Modern server and client computing platforms have multiple channels of dynamic random access memory (DRAM) that form a system memory and use configurable address maps to map physical addresses to specific channels. However, this mapping is unfortunately fixed at boot and hence cannot be optimized in an application-specific manner. Thus, a platform designer typically chooses an address mapping rule that performs best in an average scenario, but is not optimized for any particular application. This static boot address mapping leads to a sub-optimal solution at an individual application level.

DETAILED DESCRIPTION

Figure 1:
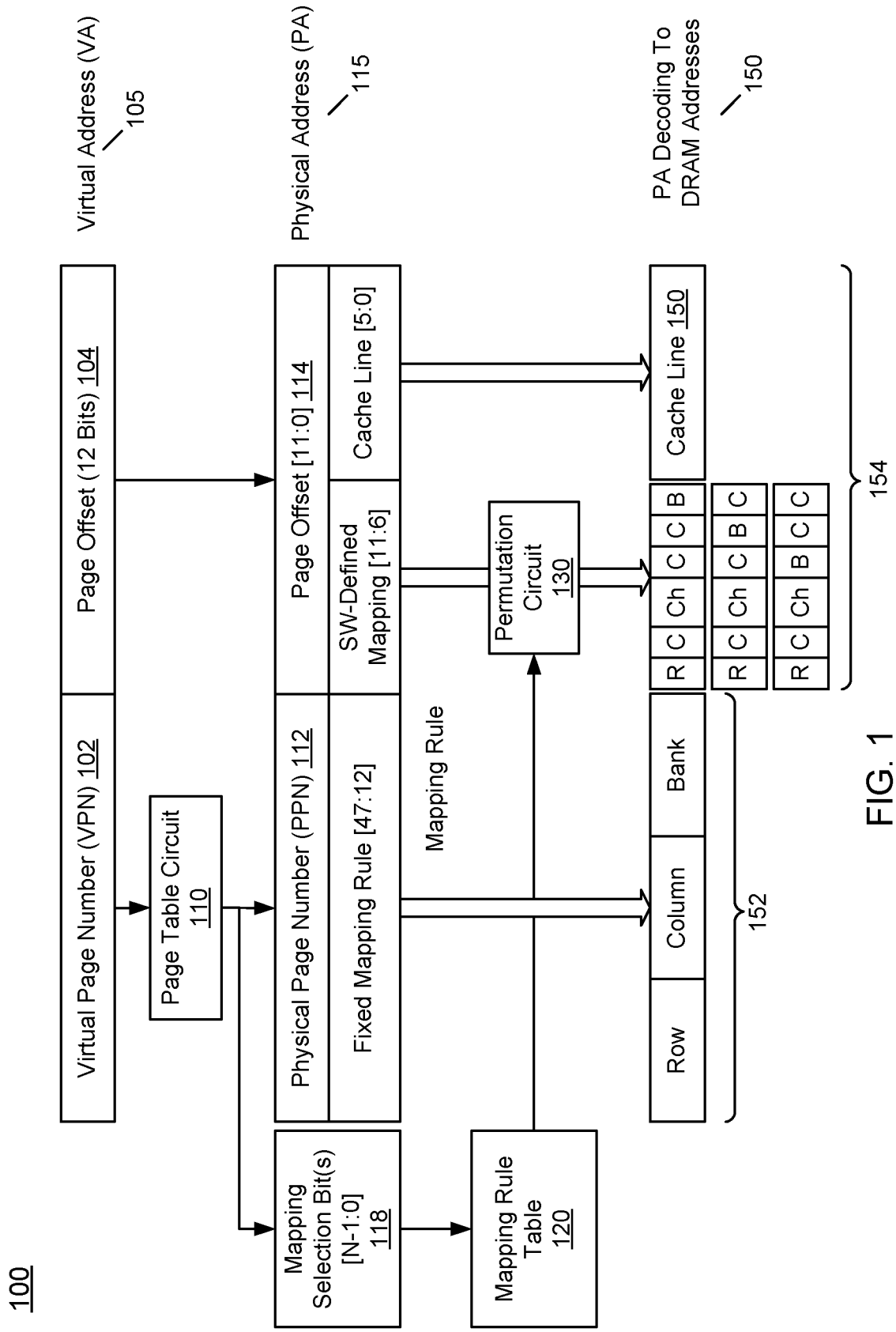
FIG. 1 is a block diagram of a portion of a processor including an embodiment of the present invention.

In various embodiments, a processor is configured to perform dynamic and programmable selective address decoding of at least portions of a physical address to be provided from the processor to a memory, to optimize memory access by a given application (or workload segment of such application) in execution. In this way, reduced latencies and/or increased bandwidth may be realized for memory accesses occurring during application execution, improving performance.

While embodiments are described herein in the context of hardware circuitry to permute at least certain address bits of a physical address based on hint information received from an application, understand the scope of the present invention is not limited in this regard and in other cases, the dynamic application-specific address mapping techniques described herein may be performed in other portions of a processor, within system memory itself and/or by firmware and/or software.

Within a processor, an application or other software in execution issues memory access transactions (e.g., read or write requests) using a virtual address (VA). In turn, processor hardware, generically referred to herein as a memory management unit (MMU), which may include one or more translation lookaside buffers (TLBs), page table structures and so forth, operates to translate this VA to a physical address (PA). In turn, this physical address is provided to a system memory (e.g., a dynamic random access memory (DRAM)) that performs the actual memory access. In general, this address translation scheme operates by first converting, using page tables, a page address from a virtual address space to a physical address space. In turn, a given computing platform has a static (set at boot time) physical-to-memory channel mapping scheme that is used to map the resulting physical address to a given memory channel for the system memory. Such physical-to-channel mapping scheme is static, such that once set during boot it cannot be updated during a boot cycle.

In embodiments, an additional physical-to-physical address mapping may be provided between the VA-to-PA translation and the physical-to-channel mapping scheme. More particularly, a set of configurable permutations to a certain subset of address bits may be performed to modify this physical-to-channel mapping scheme dynamically, e.g., based on a given workload, application or other grouping of instructions, to optimize memory accesses.

In embodiments, an application may provide hint information regarding its memory access characteristics or other operation parameters to an operating system (OS) kernel or other supervisor software, e.g., upon initialization of the application and/or when the application requests allocation of one or more pages of memory. In turn, based on this information, the OS kernel may set so-called mapping metadata for a page. In turn, this mapping metadata may be used to dynamically control this third physical-to-physical address mapping to realize memory access optimizations. In an embodiment, this mapping metadata may be implemented as one or more mapping metabits that are written into the page on allocation by the OS kernel. Such mapping metabits may be stored along with other metadata regarding the page.

Table 1 below shows example metadata included on a per page basis, as configured by a kernel when a page is created. Note that such metadata is written by the kernel only when the page is created and is not thereafter able to be updated. In turn, at least the mapping metabits of this metadata may be stored in page table entries for ready access during address translations as described herein. In embodiments, the mapping metabits may be used to permute a subset of bits of a physical address.

TABLE 1

| | |
|---|---|
| PAGE_PRESENT | Page is resident in memory and not swapped out |
| PAGE_PROTNONE | Page is resident but not accessible |
| PAGE_RW | Set if the page may be written to |
| PAGE_USER | Set if the page is accessible from user space |
| PAGE_DIRTY | Set if the page is written to |
| PAGE_ACCESSED | Set if the page is accessed |
| MAPPING BIT(S) | Set at page allocation |

As described above, these mapping metabits may be set on a per page basis on page creation. In some cases, the dynamic address mapping techniques herein may be disabled, e.g., by setting these bits to zero, which may be performed under control of the OS kernel.

In an embodiment, the hint information provided via a software interface may be used to provide a request for a particular intra-page striding pattern. In different examples, the application can either specify the exact metabits it wishes to utilize or it can specify a category of pages to utilize and the OS can translate it based on what the system supports. In turn, the OS kernel may use this information to set the appropriate mapping metabits for all pages to be used by the application. Note that when an application accesses pages created by another process (e.g., a kernel for system calls), it inherits any intra-page striding pattern of that process via such mapping metabits.

Using embodiments, an intra-page mapping scheme is provided that can take into account fine-grained characteristics of system memory. For example, system memory can be optimized to achieve better latency, better bandwidth, or a varying tradeoff between both extremes. For example, with embodiments memory traffic may be distributed in a fine-grained manner among multiple available memory channels. For example, for input/output (I/O) workloads, fine-grained distribution across such available memory channels (e.g., on the basis of a single cache line or small number of consecutive cache lines) may optimize memory traffic.

Thus embodiments provide a software-defined physical-to-memory address transform layer in an address mapping scheme. More particularly with embodiments herein, some permutation or transformation of one or more bits within a page offset portion of a physical address may occur to provide a selected one of multiple interleaving patterns that may be more attuned for a particular application workload. Note that in an embodiment, such mapping metadata, also referred to herein as mapping selection bits, may be stored with a physical page number in a page table entry.

Referring now to FIG. 1, shown is a block diagram of a portion of a processor including an embodiment of the present invention, namely a portion of a processor 100 that is involved in performing application-specific address mapping. As illustrated, processor 100 includes a page table circuit 110, configured to receive a portion of a virtual address 105. In the embodiment shown, virtual address 105 may be separated into a virtual page number portion 102 and a page offset portion 104. In the embodiment of FIG. 1, virtual page number portion 102 may be formed of 36 bits and page offset portion 104 may be formed of 12 bits. Understand the scope of the present invention is not limited in this regard and virtual addresses may take other widths and forms in other embodiments.

In any event, virtual page number portion 102 is provided to a page table circuit 110. In embodiments, page table circuit 110 may include a plurality of paging structures each to store portions of recently accessed virtual address-to-physical address translations. As a result, page table circuit 110 outputs a physical page number portion 112 that forms a portion of a physical address 115 (further including page offset portion 114).

Understand that the page table information stored within page table circuit 110 may further include additional information, including metadata associated with the pages for which translations are present in the page tables. For purposes of performing address permutations as described herein, this page metadata may include one or more mapping metabits per page that may be used as mapping selection bits. Thus as shown in FIG. 1, page table circuit 110 provides such mapping selection bits 118 to a mapping rule table 120. Although shown as a separate table structure the embodiment of FIG. 1, in some cases mapping rule table 120 may be located within page table circuit 110. In embodiments, mapping rule table 120 may include a plurality of entries, each to store a mapping rule. Based on the received mapping selection bits, a given one of these multiple mapping rules may be accessed, and the selected mapping rule is output to a permutation circuit 130.

As illustrated, permutation circuit 130 receives, in addition to this mapping rule, a portion of page offset portion 114. More specifically, permutation circuit 130 is coupled to receive bits 11:6 of the page offset portion. Permutation circuit 130 may permute these bits according to this received mapping rule. In this way, permutation circuit 130 outputs the same values of this portion of page offset portion 114; however, these values are re-distributed according to the permutation, such that a different order of the bits results.

Thus as illustrated, an output physical address 150 includes a set of permuted bits, namely bits 11:6 of page offset portion 154 as illustrated (with the different example mappings of the bit to rank (r), column (c), channel (ch) and bank (b)). Note that a cache line portion of page offset portion 154 is not permuted. In addition, physical page number portion 152 which includes bits to identify at least portions of a row, column and bank for the resulting physical address 150 also is not permuted.

Note that page offset portion 104 of VA 105 is not translated and instead is directly concatenated to translated physical page number portion 112 to form physical address 115. Note that mapping selection bits 118 may be obtained from the same paging table structures as physical page number portion 112. In embodiments where bits 11:6 of page offset portion 114 are permuted, a maximum number of possible permutations is $2^6$, or 64 possible permutations.

Thus a resulting transformed or permuted physical address 150 provides a physical page number portion 152 that has a single decoding rule conventionally applied (in which provides row, column, and bank information), and a software-defined permutable portion of page offset portion 154 that may have one of a set of different decoding rules that is selected based on application-directed information. Note that while a variety of different permutations are possible, Table 2 below shows multiple possible re-orderings of page offset bits to realize different performance optimizations.

TABLE 2

Figure 2:
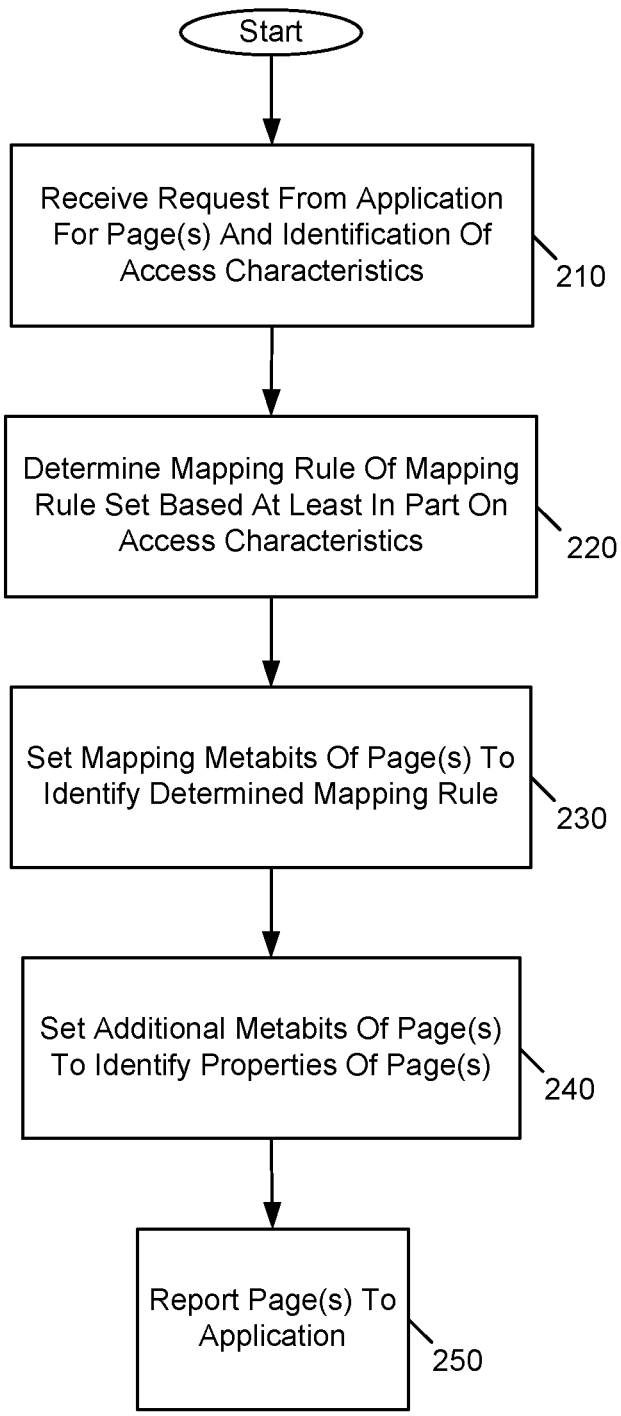
FIG. 2 is a flow diagram of a method in accordance with an embodiment of the present invention.

R C C C Ch B -> Most Bandwidth
R C Ch C C B -> Bandwidth
R C Ch C B C -> Medium Bandwidth, Medium Latency
R C Ch B C C -> Most Latency As shown in Table 2, by performing different permutations to page offset bits used for accessing one or more of row (r), column (c), channel (ch), or bank (b), different performance optimizations for the resulting memory accesses with regard to bandwidth and latency may be realized. Understand that these example permutations are for illustration only, and many other permutations are possible. Furthermore, understand that with such additional permutations, other optimizations for memory accesses, including optimizations for memory power consumption also may be realized. Understand while shown at this high level in the embodiment of FIG. 1, many variations and alternatives are possible Referring now to FIG. 2, shown is a flow diagram of a method in accordance with an embodiment of the present invention. As shown in FIG. 2, method 200 is a method for controlling application-specific address mapping for a system memory. In an embodiment, method 200 may be performed by an OS kernel or other supervisor that configures memory pages in response to allocation requests from applications or other source. Method 200 may be performed, in various embodiments, by hardware circuitry, firmware, software and/or combinations thereof.

As illustrated, method 200 begins by receiving a request from an application for allocation of one or more pages of memory (block 210). More specifically, this request may be received for some amount of memory. In addition to the request for memory allocation, the application may further provide identification of access characteristics with regard to a workload of the application. For example, such access characteristics may include information regarding bandwidth consumption, latency requirements, power consumption, reliability and so forth.

Control next passes to block 220 where a mapping rule of a mapping rule set may be determined based at least in part on the access characteristics. As described herein, there may be multiple address mappings possible for intra-page accesses to a page. In embodiments, the OS kernel may determine a selected mapping to best meet the access characteristics of the application.

To effect this mapping rule, one or more mapping metabits of the page may be set to identify the determined mapping rule (block 230). In an embodiment, between 1 and 6 metabits can be used to identify a given mapping rule, which may be stored in mapping rule table, as described herein. In addition to mapping metabits, additional bits associated with the page also may be set to identify page properties (block 240). For example, metabits may relate to page residency, access protection information, write capability and so forth. Finally, at block 250, the pages allocated can be reported to the application. Understand while shown at this high level in the embodiment of FIG. 2, many variations and alternatives are possible.

Figure 3:
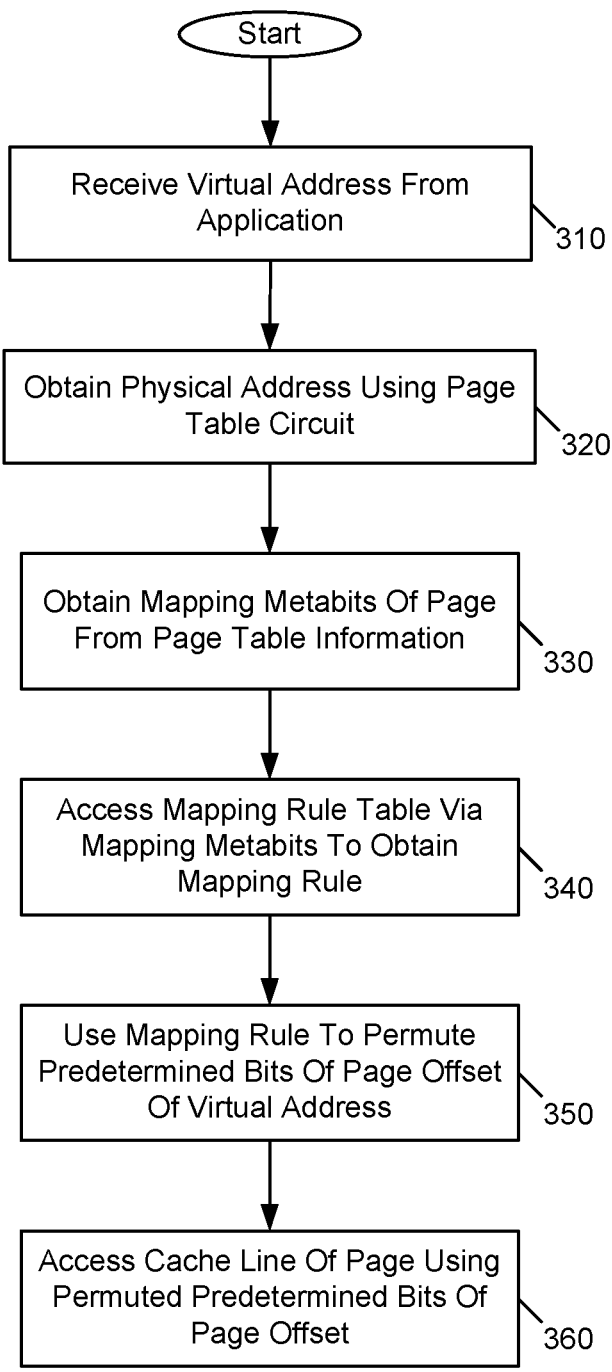
FIG. 3 is a flow diagram of a method in accordance with another embodiment of the present invention.

Referring now to FIG. 3, shown is a flow diagram of a method in accordance with another embodiment of the present invention. As shown in FIG. 3, method 300 is a method for forming application-specific address mapping of addresses during execution of an application. As such, method 300 may be performed by address mapping circuitry of a processor, such as a memory management unit, translation lookaside buffer and/or additional circuitry. In any event, method 300 may be performed by hardware circuitry, firmware, software and/or combinations thereof.

As illustrated, method 300 begins by receiving a virtual address from an application (block 310). Understand that this virtual address may be received in connection with a memory request, e.g., a read or write request. From this virtual address, a physical address may be obtained using a page table circuit (block 320). For example, with a 64-bit virtual address, bits 47:12 of the address may be used to obtain a physical page address from a set of page tables.

Still referring to FIG. 3, next at block 330, mapping metabits of the page may be obtained, also from the page tables. As described above, such one or more mapping metabits may be used to access a mapping rule table. Thus at block 340 this mapping rule table may be accessed using the mapping metabits to obtain a mapping rule. For example, the mapping table may include a plurality of entries, each of which stores a given mapping rule. Based on the metabits, access to a given one of these entries may be made to obtain the mapping rule.

Still with reference to FIG. 3, next at block 350 this mapping rule may be used to permute predetermined bits of a page offset of the virtual address. For example, in one embodiment, bits 11:6 of the page offset portion of the virtual address may be permuted according to this mapping rule. Thereafter, at block 360, a given cache line of the page may be accessed using the physical address having these permuted predetermined bits of the page offset. In this way, the application is provided with the requested data, in the context of a read request, and in turn, write information may be written to the cache line, in the context of a write request. Understand while shown at this high level in the embodiment of FIG. 3, many variations and alternatives are possible.

Figure 4A:
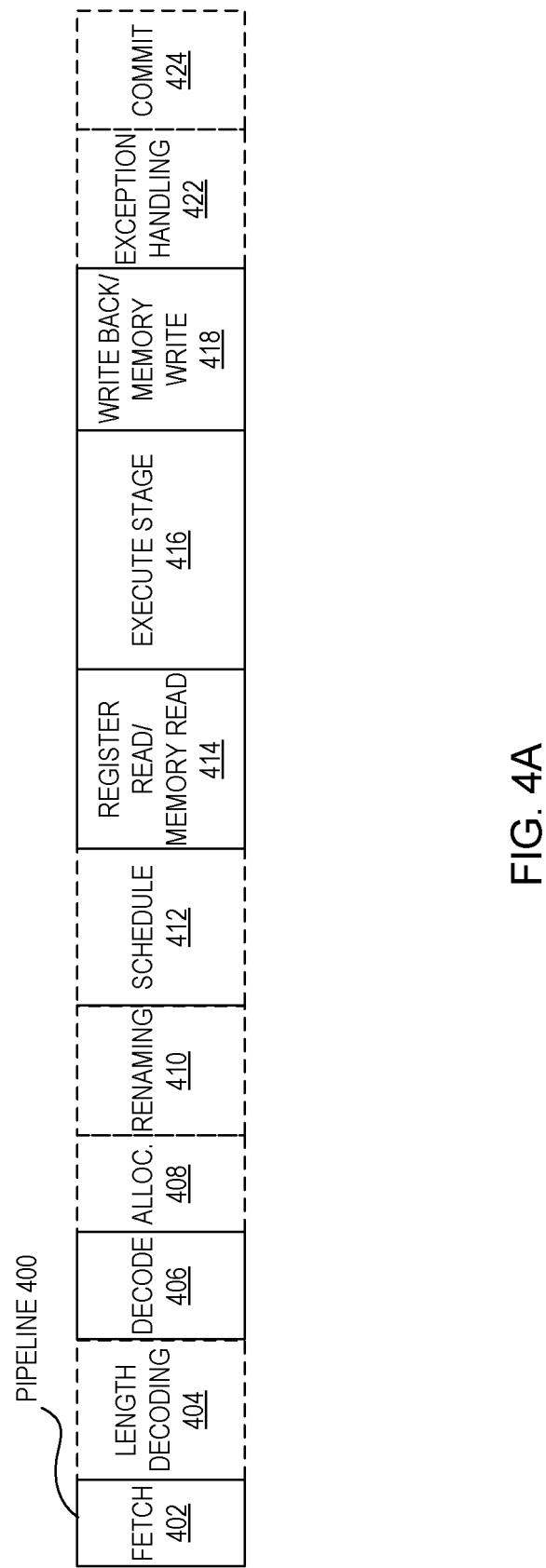
FIG. 4A is a block diagram illustrating both an exemplary in-order pipeline and an exemplary register renaming, out-of-order issue/execution pipeline according to embodiments of the invention.
Figure 4B:
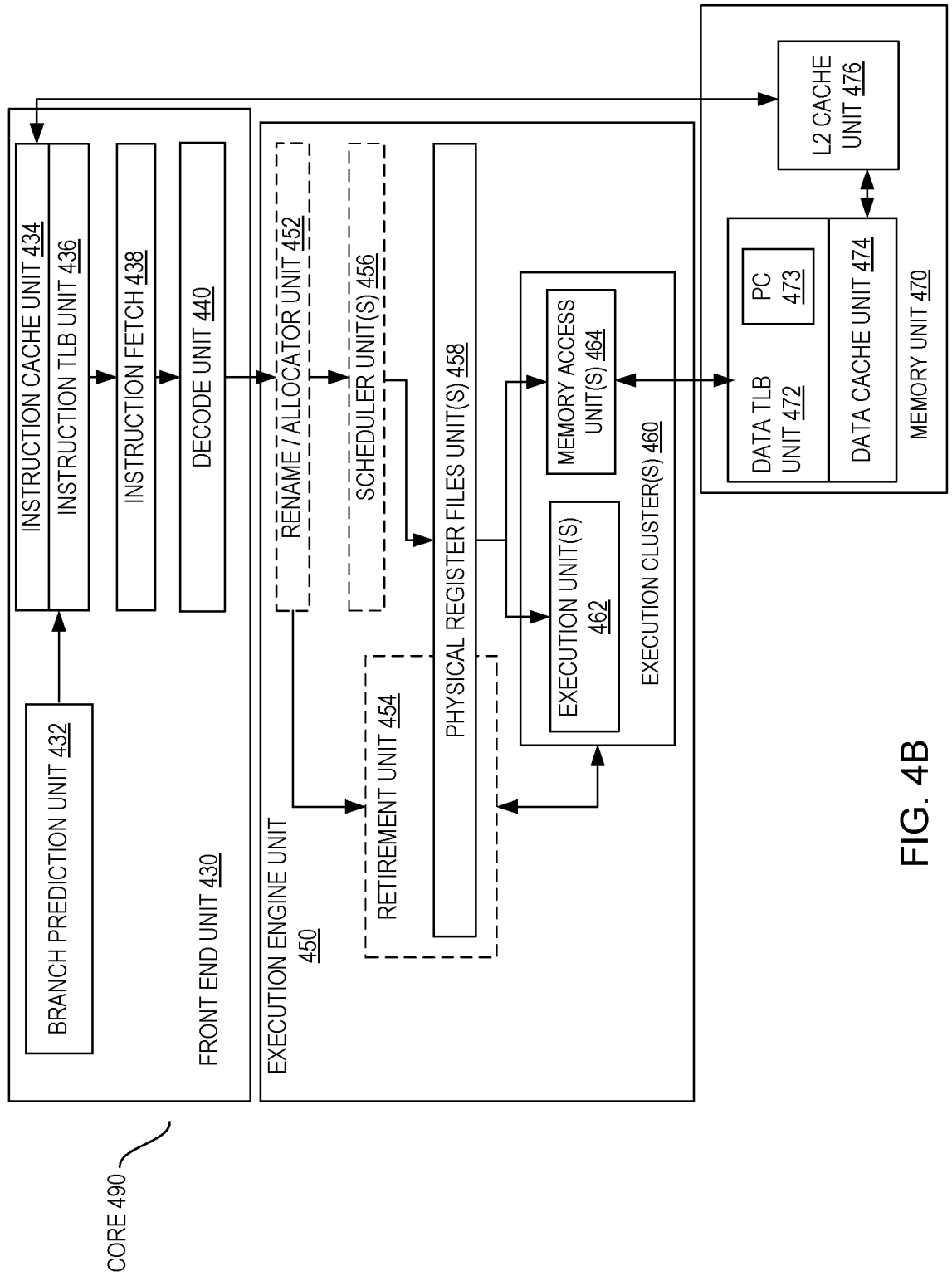
FIG. 4B is a block diagram illustrating both an exemplary embodiment of an in-order architecture core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A and 4B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector register unit, a write mask register unit, and a scalar register unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. The data TLB unit 472 may include a permutation circuit 473 as described herein to permute predetermined bits of a physical address based on a selecting mapping rule, to optimize memory accesses as described herein. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
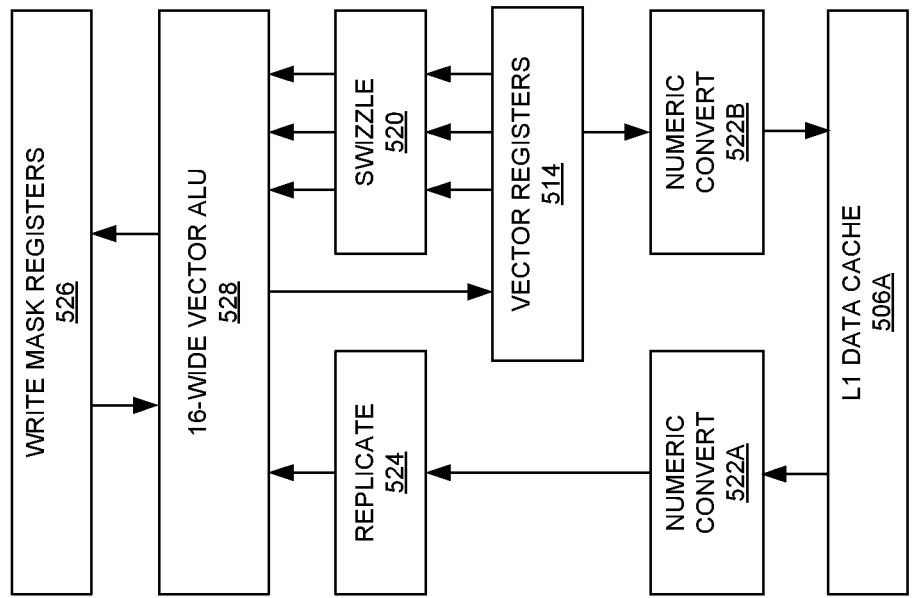
FIGS. 5A and 5B illustrate a block diagram of a more specific exemplary in-order core architecture, which core would be one of several logic blocks (including other cores of the same type and/or different types) in a chip.
Figure 5A:
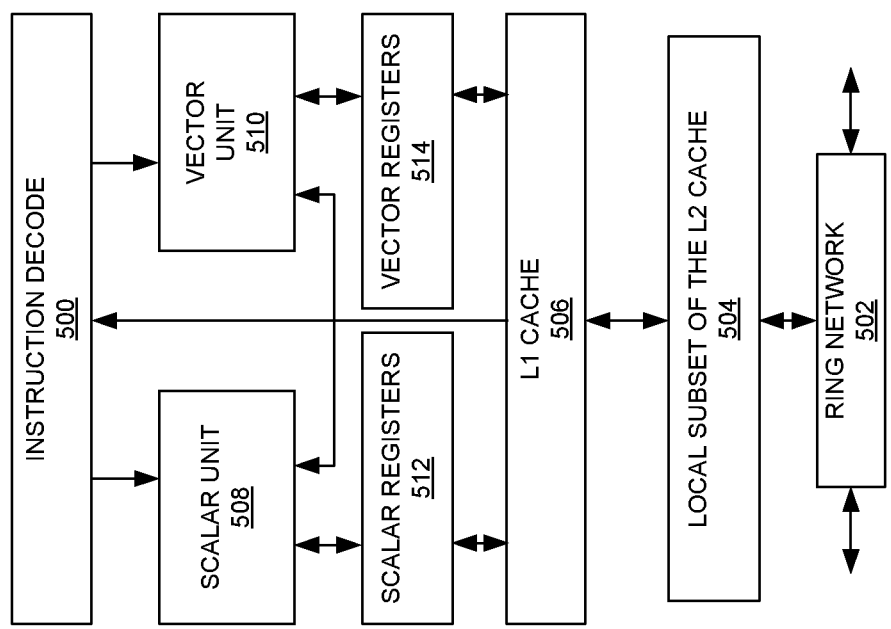

FIGS. 5A and 5B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 512-bits wide per direction.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Figure 6:
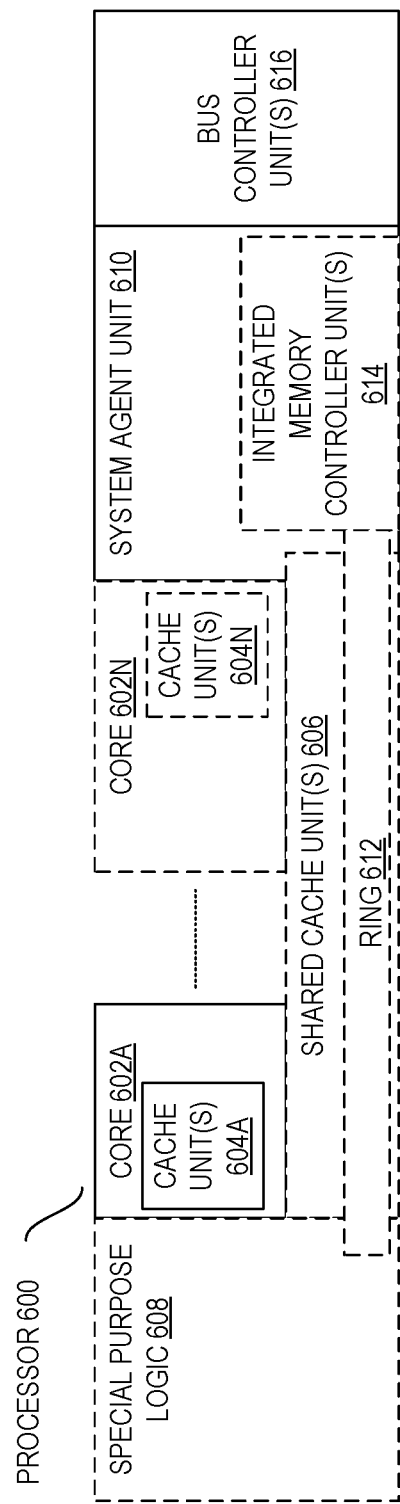
FIG. 6 is a block diagram of a processor that may have more than one core, may have an integrated memory controller, and may have integrated graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache units 604A-N within the cores (one of which may include a field scan controller and other circuitry as described herein), a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the special purpose logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602A-N.

In some embodiments, one or more of the cores 602A-N are capable of multithreading. The system agent unit 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
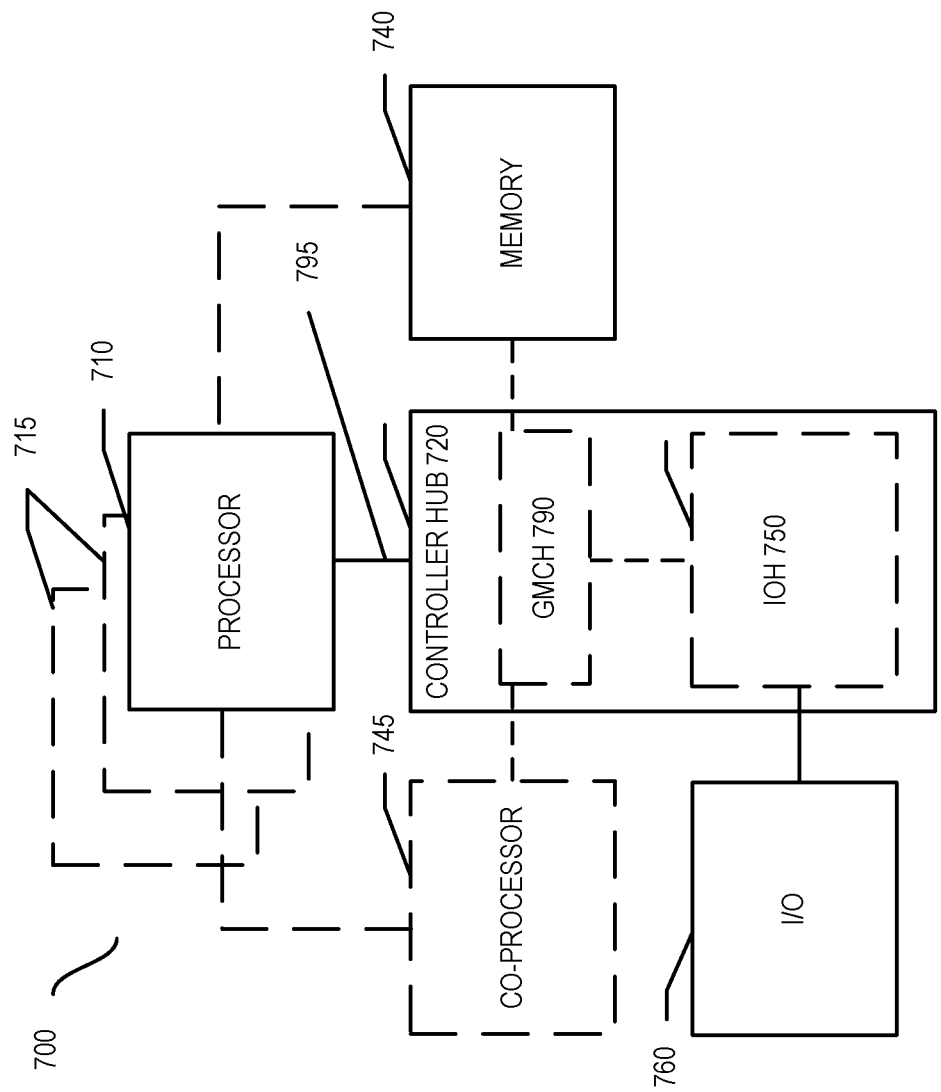
FIG. 7 is a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes a memory controller and a graphics controller to which are coupled memory 740 and a coprocessor 745; the IOH 750 couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
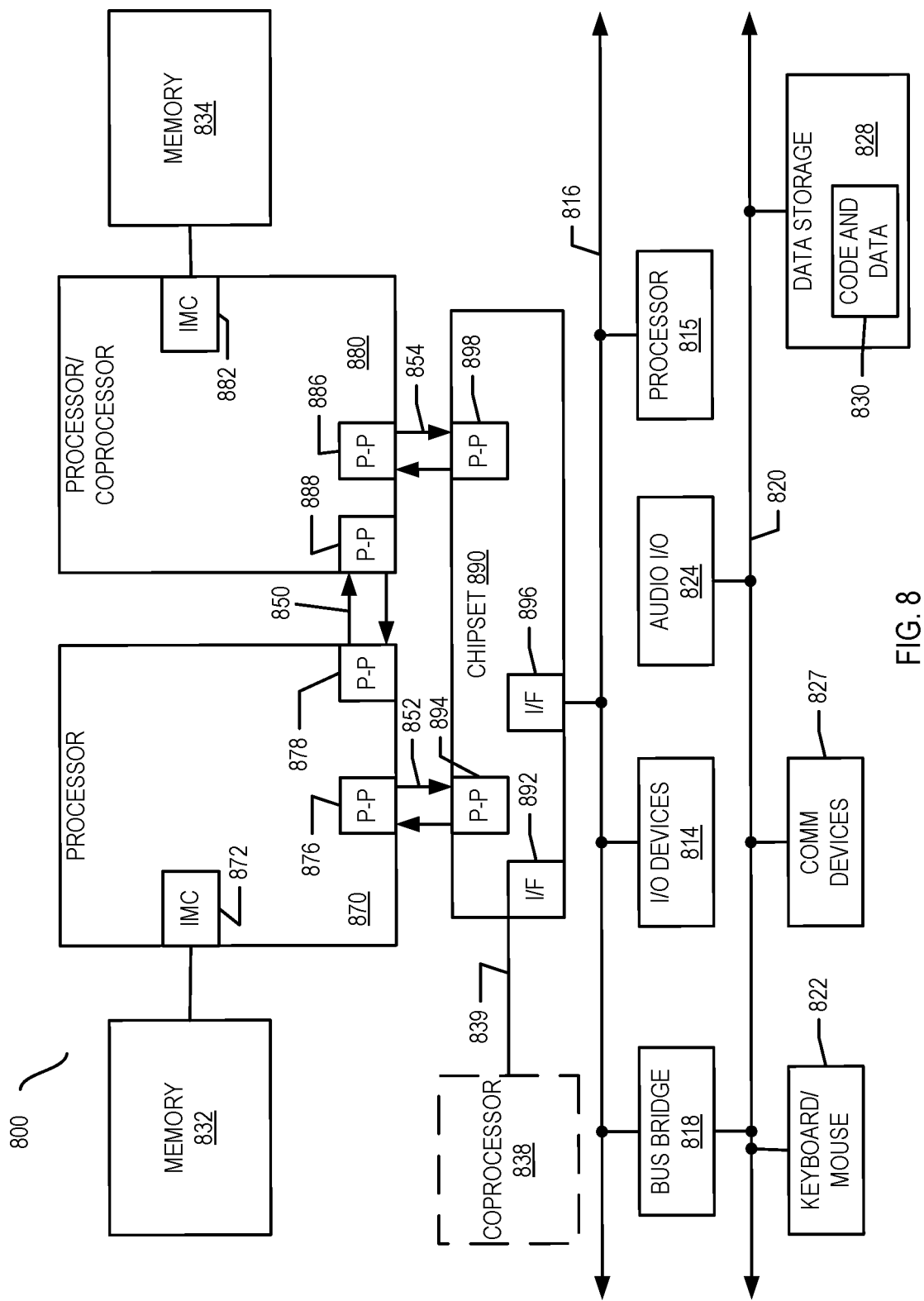
FIG. 8 is a block diagram of a first more specific exemplary system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 800. In one embodiment of the invention, processors 870 and 880 are respectively processors 710 and 710, while coprocessor 838 is coprocessor 745. In another embodiment, processors 870 and 880 are respectively processor 710 and coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
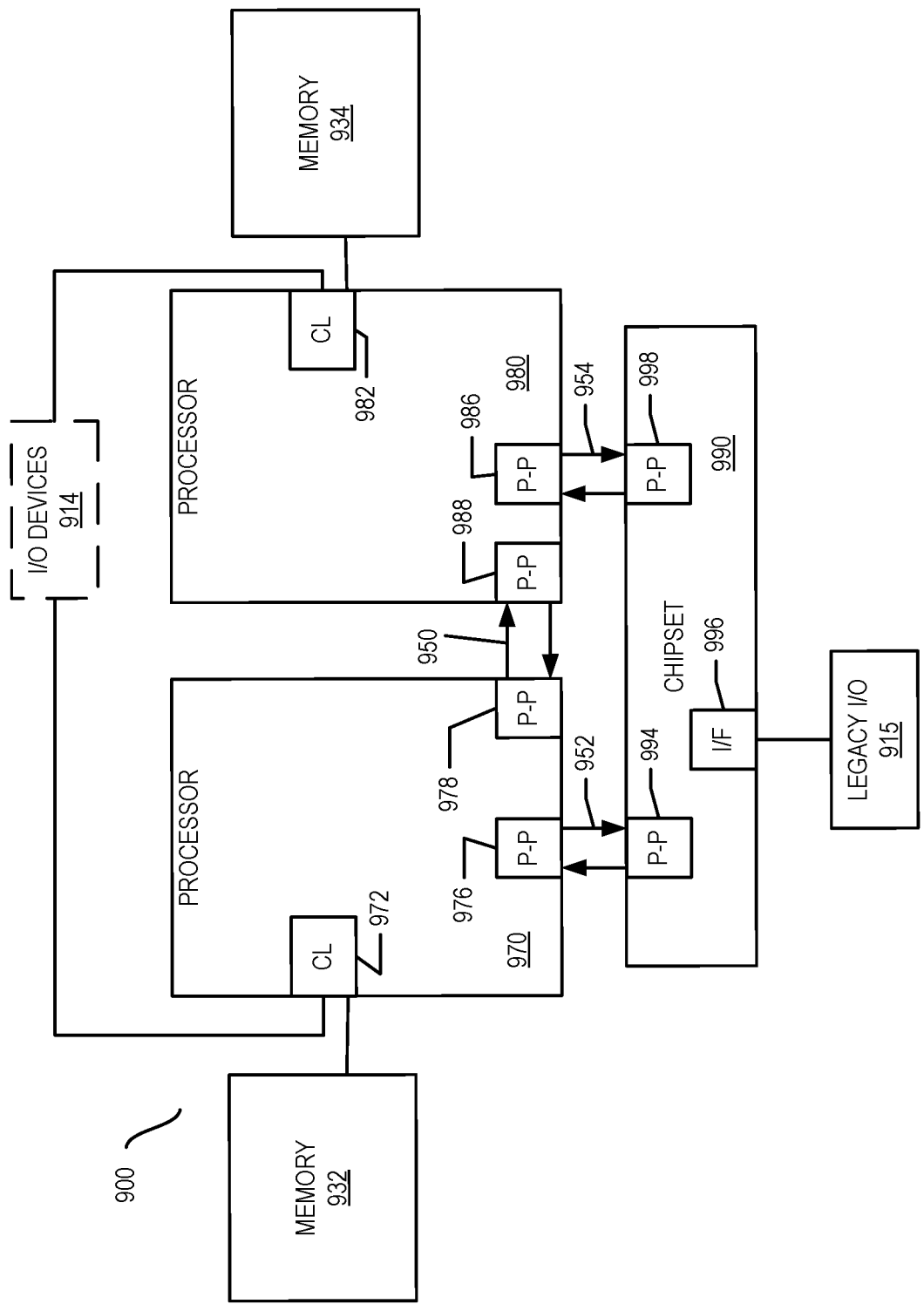
FIG. 9 is a block diagram of a second more specific exemplary system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
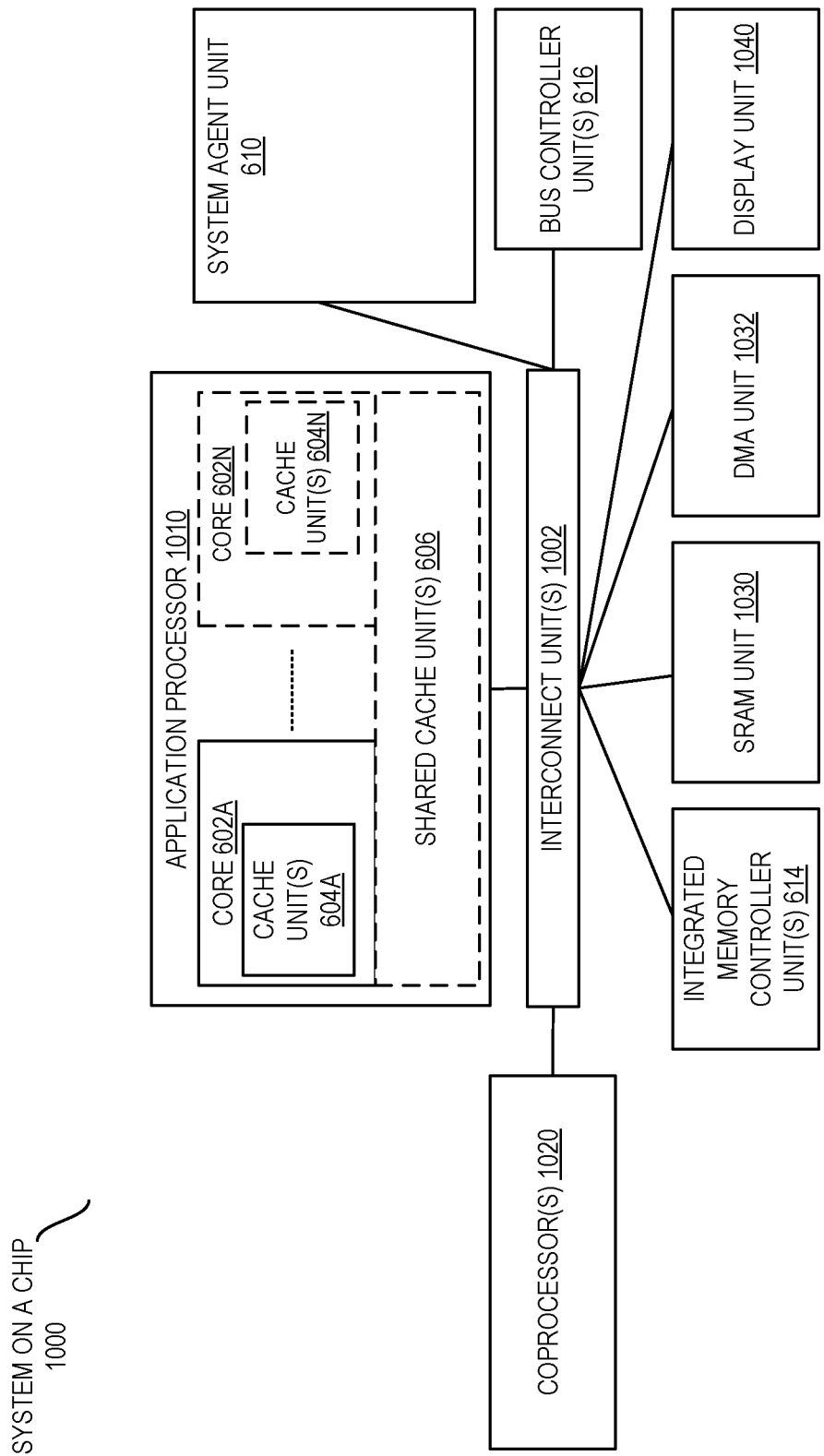
FIG. 10 is a block diagram of a SoC in accordance with an embodiment of the present invention.

Referring now to FIG. 10, shown is a block diagram of a SoC 1000 in accordance with an embodiment of the present invention. Similar elements in FIG. 10 bear like reference numerals. Also, dashed lined boxes are optional features on more advanced SoCs. In FIG. 10, an interconnect unit(s) 1002 is coupled to: an application processor 1010 which includes a set of one or more cores 602A-N (including constituent cache units 604A-N) and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
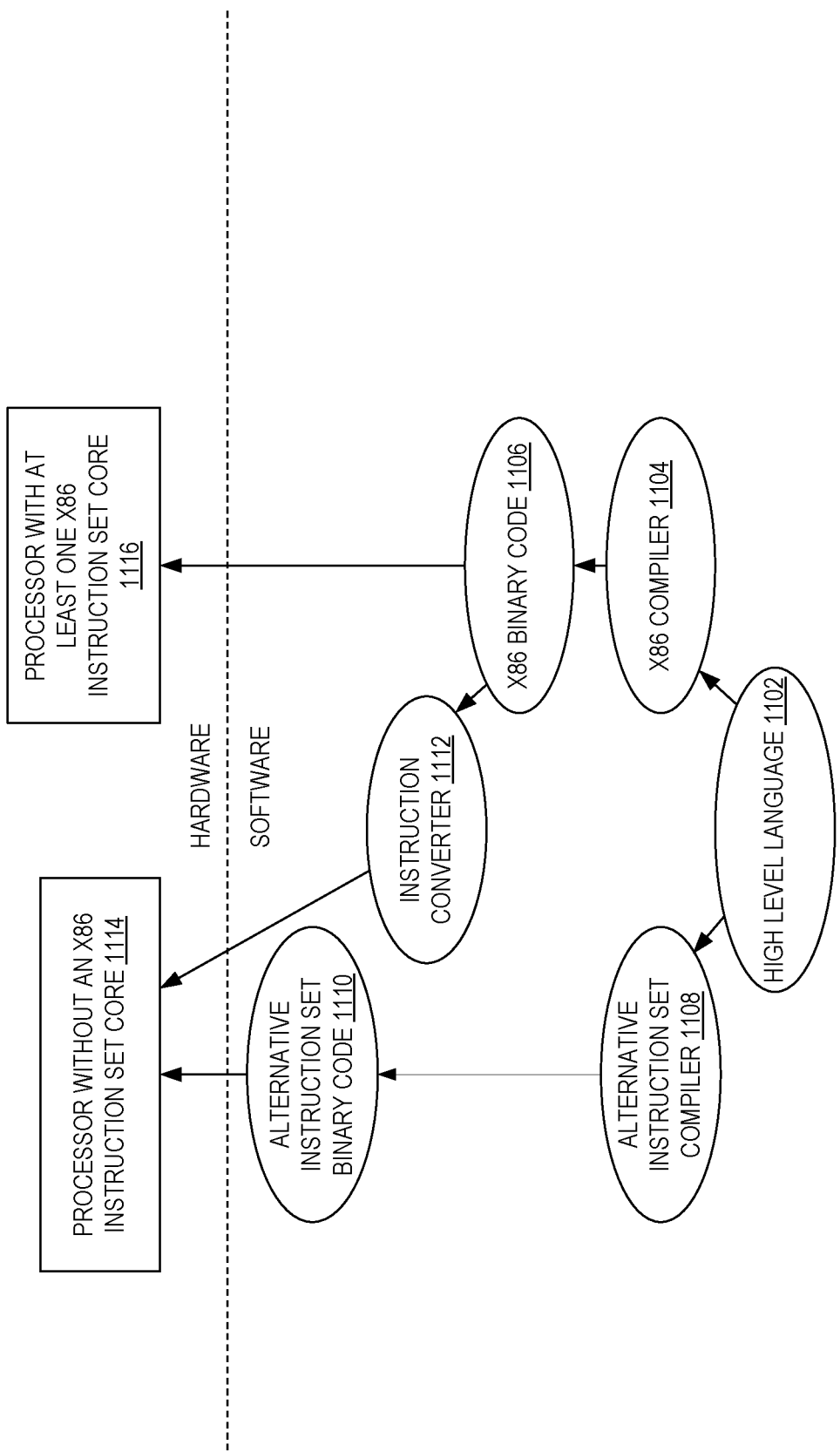
FIG. 11 is a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

The following examples pertain to further embodiments.

In one example, an apparatus comprises: a page table circuit to generate at least a portion of a physical address therefrom; and a mapping rule table coupled to the page table circuit, the mapping rule table to receive mapping metadata of a page of a system memory and, based on the mapping metadata, output a mapping rule for the page.

In an example, a kernel is to write the mapping metadata of the page based at least in part on memory access characteristics of an application to which the page is allocated.

In an example, the apparatus is to provide hint information regarding the memory access characteristics to the kernel.

In an example, the apparatus further comprises a permutation circuit to permute a subset of a page offset portion of the physical address based on the mapping rule.

In an example, the apparatus further comprises a memory controller to receive and send to the system memory the physical address comprising the permuted subset of the page offset portion of the physical address, to enable access to the page.

In an example, for a first page having first mapping metadata, consecutive cache lines of the first page are to be stored in different banks of the system memory.

In an example, for a second page having second mapping metadata, consecutive cache lines of the second page are to be stored in a first channel of the system memory.

In an example, for the second page having the second mapping metadata, a first plurality of consecutive cache lines are to be stored in the same bank of the first channel of the system memory.

In an example, for a third page having third mapping metadata, a second plurality of consecutive cache lines are to be stored in the same bank of the first channel of the system memory, the second plurality of consecutive cache lines greater than the first plurality of consecutive cache lines.

In an example, the page table circuit includes a storage to store translation information for a plurality of page tables, at least one of the plurality of page tables to store the mapping metadata.

In another example, a method comprises: receiving, in a page table circuit of a processor, a virtual address from an application, the virtual address associated with a page in a memory; obtaining a physical address for the virtual address from one or more page tables; obtaining one or more mapping metabits of the page; accessing a mapping rule table using the one or more mapping metabits to obtain a mapping rule; permuting a predetermined portion of a page offset portion of the physical address using the mapping rule; and sending the physical address including the permuted predetermined portion of the page offset portion to the memory to access a cache line stored in the page.

In an example, the method further comprises obtaining the one or more mapping metabits from the one or more page tables.

In an example, the one or more mapping metabits is based on access characteristics of the application.

In an example, the method further comprises writing the one or more mapping metabits in the page during allocation of the page to the application.

In an example, the method further comprises: writing the one or more mapping metabits having a first value to the page to optimize memory accesses to the memory by the application; and writing one or more second mapping metabits having a second value to a second page to optimize memory accesses to the memory by a second application.

In an example, the method further comprises preventing update to the one or more mapping metabits after writing the one or more mapping metabits to the page.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes a processor comprising: at least one core comprising a memory management unit comprising: a cache memory to store translation information of plurality of page tables, the memory management unit to receive at least a portion of a virtual address and to generate at least a portion of a physical address therefrom; a mapping rule table to receive mapping metadata of a page of a dynamic random access memory and output a mapping rule for the page, based on the mapping metadata; and a permutation circuit to permute a subset of a page offset portion of the physical address based on the mapping rule. The processor also includes a memory controller coupled to the at least one core, the memory controller to send the physical address having the permuted subset of the page offset portion to the dynamic random access memory. The system further includes the dynamic random access memory coupled to the processor.

In an example, a kernel is to write the mapping metadata of the page based at least in part on memory access characteristics of an application to which the page is allocated, the application to provide hint information regarding the memory access characteristics to the kernel.

In an example, the permutation circuit is to permute a first physical address for a first page having first mapping metadata based on a first mapping rule, to cause consecutive cache lines of the first page to be stored in different banks of the dynamic random access memory.

In an example, the permutation circuit is to permute a second physical address for a second page having second mapping metadata based on a second mapping rule, to cause consecutive cache lines of the second page to be stored in a first channel of the dynamic random access memory.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a page table circuit to receive a virtual address and to generate at least a portion of a physical address therefrom; and
a mapping rule table coupled to the page table circuit, the mapping rule table to receive mapping metadata for a page of a dynamic random access memory (DRAM) of a system memory and, based on the mapping metadata, output a mapping rule for the page.

2. The apparatus of claim 1, wherein a kernel is to write the mapping metadata of the page based at least in part on memory access characteristics of an application to which the page is allocated.

3. The apparatus of claim 2, wherein the application is to provide hint information regarding the memory access characteristics to the kernel.

4. The apparatus of claim 1, further comprising a permutation circuit to permute a subset of a page offset portion of the physical address based on the mapping rule.

5. The apparatus of claim 4, further comprising a memory controller to receive and send to the DRAM the physical address comprising the permuted subset of the page offset portion of the physical address, to enable access to the page.

6. The apparatus of claim 3, wherein for a first page having first mapping metadata, consecutive cache lines of the first page are to be stored in different banks of the system memory.

7. The apparatus of claim 6, wherein for a second page having second mapping metadata, consecutive cache lines of the second page are to be stored in a first channel of the system memory.

8. The apparatus of claim 7, wherein for the second page having the second mapping metadata, a first plurality of consecutive cache lines are to be stored in the same bank of the first channel of the system memory.

9. The apparatus of claim 8, wherein for a third page having third mapping metadata, a second plurality of consecutive cache lines are to be stored in the same bank of the first channel of the system memory, the second plurality of consecutive cache lines greater than the first plurality of consecutive cache lines.

10. The apparatus of claim 1, wherein the page table circuit includes a storage to store translation information for a plurality of page tables, at least one of the plurality of page tables to store the mapping metadata.

11. A non-transitory machine-readable medium having stored thereon instructions, which if performed by a machine cause the machine to perform a method comprising:
receiving, in a page table circuit of a processor, a virtual address from an application, the virtual address associated with a page in a memory;
obtaining a physical address for the virtual address from one or more page tables;
obtaining one or more mapping metabits for the page;
accessing a mapping rule table using the one or more mapping metabits to obtain a mapping rule;
permuting a predetermined portion of a page offset portion of the physical address using the mapping rule; and
sending the physical address including the permuted predetermined portion of the page offset portion to the memory to access a cache line stored in the page.

12. The non-transitory machine-readable medium of claim 11, wherein the method further comprises obtaining the one or more mapping metabits from the one or more page tables.

13. The non-transitory machine-readable medium of claim 11, wherein the method further comprises writing the one or more mapping metabits in the page during allocation of the page to the application, based at least in part on hint information from the application.

14. The non-transitory machine-readable medium of claim 13, wherein the method further comprises:
writing the one or more mapping metabits having a first value to the page to optimize memory accesses to the memory by the application; and
writing one or more second mapping metabits having a second value to a second page to optimize memory accesses to the memory by a second application.

15. The non-transitory machine-readable medium of claim 13, wherein the method further comprises preventing update to the one or more mapping metabits after writing the one or more mapping metabits to the page.

16. A system comprising:
a processor comprising:
at least one core comprising:
a memory management unit comprising:
a cache memory to store translation information of a plurality of page tables, wherein the memory management unit is to receive at least a portion of a virtual address and to generate at least a portion of a physical address therefrom;
a mapping rule table to receive mapping metadata of a page of a dynamic random access memory and output a mapping rule for the page, based on the mapping metadata; and
a permutation circuit to permute a subset of a page offset portion of the physical address based on the mapping rule; and
a memory controller coupled to the at least one core, the memory controller to send the physical address having the permuted subset of the page offset portion to the dynamic random access memory; and
the dynamic random access memory coupled to the processor.

17. The system of claim 16, wherein a kernel is to write the mapping metadata of the page based at least in part on memory access characteristics of an application to which the page is allocated, the application to provide hint information regarding the memory access characteristics to the kernel.

18. The system of claim 16, wherein the permutation circuit is to permute a first physical address for a first page having first mapping metadata based on a first mapping rule, to cause consecutive cache lines of the first page to be stored in different banks of the dynamic random access memory.

19. The system of claim 18, wherein the permutation circuit is to permute a second physical address for a second page having second mapping metadata based on a second mapping rule, to cause consecutive cache lines of the second page to be stored in a first channel of the dynamic random access memory, and permute a third physical address for a third page having third mapping metadata based on a third mapping rule, to cause second consecutive cache lines of the second page to be stored in the first channel of the dynamic random access memory, the second consecutive cache lines greater than the consecutive cache lines.

20. The apparatus of claim 1, wherein the page of the DRAM is to store the mapping metadata.

* * * * *